US011205155B2

(12) United States Patent
Wakankar et al.

(10) Patent No.: US 11,205,155 B2
(45) Date of Patent: Dec. 21, 2021

(54) DATA SELECTION BASED ON CAREER TRANSITION EMBEDDINGS

(71) Applicant: Microsoft Technology Licensing, LLC, Redmond, WA (US)

(72) Inventors: Swanand Wakankar, Campbell, CA (US); Meng Meng, San Jose, CA (US); Cagri Ozcaglar, Sunnyvale, CA (US); Vitaly Abdrashitov, Sunnyvale, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 264 days.

(21) Appl. No.: 16/429,365

(22) Filed: Jun. 3, 2019

(65) Prior Publication Data

US 2020/0380470 A1 Dec. 3, 2020

(51) Int. Cl.
*G06Q 10/10* (2012.01)
*G06Q 10/06* (2012.01)
*G06Q 30/02* (2012.01)
*G06Q 30/08* (2012.01)
G06F 16/2455 (2019.01)
G06F 16/25 (2019.01)

(52) U.S. Cl.
CPC ..... *G06Q 10/1053* (2013.01); *G06F 16/2455* (2019.01); *G06F 16/252* (2019.01); *G06Q 10/063112* (2013.01)

(58) Field of Classification Search
CPC ........ G06Q 10/1053; G06Q 10/063112; G06F 16/2455; G06F 16/252

USPC ......................................... 705/1.1, 320, 321
See application file for complete search history.

(56) References Cited

U.S. PATENT DOCUMENTS

| 2012/0023121 A1* | 1/2012 | Foulger ................. G06F 16/954 707/767 |
| 2014/0122355 A1* | 5/2014 | Hardtke ............... G06Q 10/105 705/321 |
| 2014/0214710 A1* | 7/2014 | Dubner .............. G06Q 10/1053 705/321 |
| 2016/0132834 A1* | 5/2016 | Pattabiraman ........ G06F 16/951 705/321 |
| 2017/0344554 A1* | 11/2017 | Ha ........................ G06F 16/248 |
| 2017/0344555 A1* | 11/2017 | Yan ........................ G06Q 50/01 |
| 2017/0344556 A1* | 11/2017 | Wu .................... G06Q 10/1053 |
| 2017/0344954 A1* | 11/2017 | Xu ........................ G06F 16/248 |
| 2018/0173803 A1* | 6/2018 | Grover ................ G06F 16/9535 |

(Continued)

*Primary Examiner* — Jonathan P Ouellette
(74) *Attorney, Agent, or Firm* — Schwegman Lundberg & Woessner, P.A.

(57) ABSTRACT

Methods, systems, and computer programs are presented for improved search methods based on career transition embeddings. One method includes an operation for generating career transition vectors for members of an online service, each career transition vector comprising identifiers associated with the career transitions of each member. The method further includes operations for performing a similarity analysis of the career transition vectors to generate an embedding vector for each identifier, detecting access of a first member to a job search user interface, and selecting one or more top embedding vectors based on one or more embedding vectors of the first member. One or more search starters associated with the one or more top embedding vectors are generated, and the one or more search starters are presented on the job search user interface.

20 Claims, 11 Drawing Sheets

(56) References Cited

U.S. PATENT DOCUMENTS

2018/0336241 A1* 11/2018 Noh .................. G06F 16/958
2019/0164096 A1* 5/2019 Borje .................. G06N 5/02
2019/0171728 A1* 6/2019 Wakankar ........... G06F 16/9535
2019/0362025 A1* 11/2019 Zhou .................. G06Q 10/1053

* cited by examiner

DATA SELECTION BASED ON CAREER TRANSITION EMBEDDINGS

TECHNICAL FIELD

The subject matter disclosed herein generally relates to methods, systems, and machine-readable storage media for improving search algorithms.

BACKGROUND

Searching can be a daunting task when the search results include thousands or millions of possibilities. In particular, a job search may be an arduous task when the number of job openings that match a search query is very large. The user may have to keep adding filters in order to arrive at the desired job openings.

Some search systems assist the user by considering the characteristics of the user when performing a search. For example, if the user enters a query for software developer, the search engine may take into consideration some of the characteristics of the user to rank the results, such as experience, location, whether the user is looking for a large or small company, the user's connections, etc.

However, even after considering the user characteristics, there may still a large number of job-posting results that the user has to evaluate, making job searching a tedious task. Also, the profile of the user may include details about the past; however, the profile may not show the current interests of the user for the next job.

BRIEF DESCRIPTION OF THE DRAWINGS

Various ones of the appended drawings merely illustrate example embodiments of the present disclosure and cannot be considered as limiting its scope.

DETAILED DESCRIPTION

Figure 1:
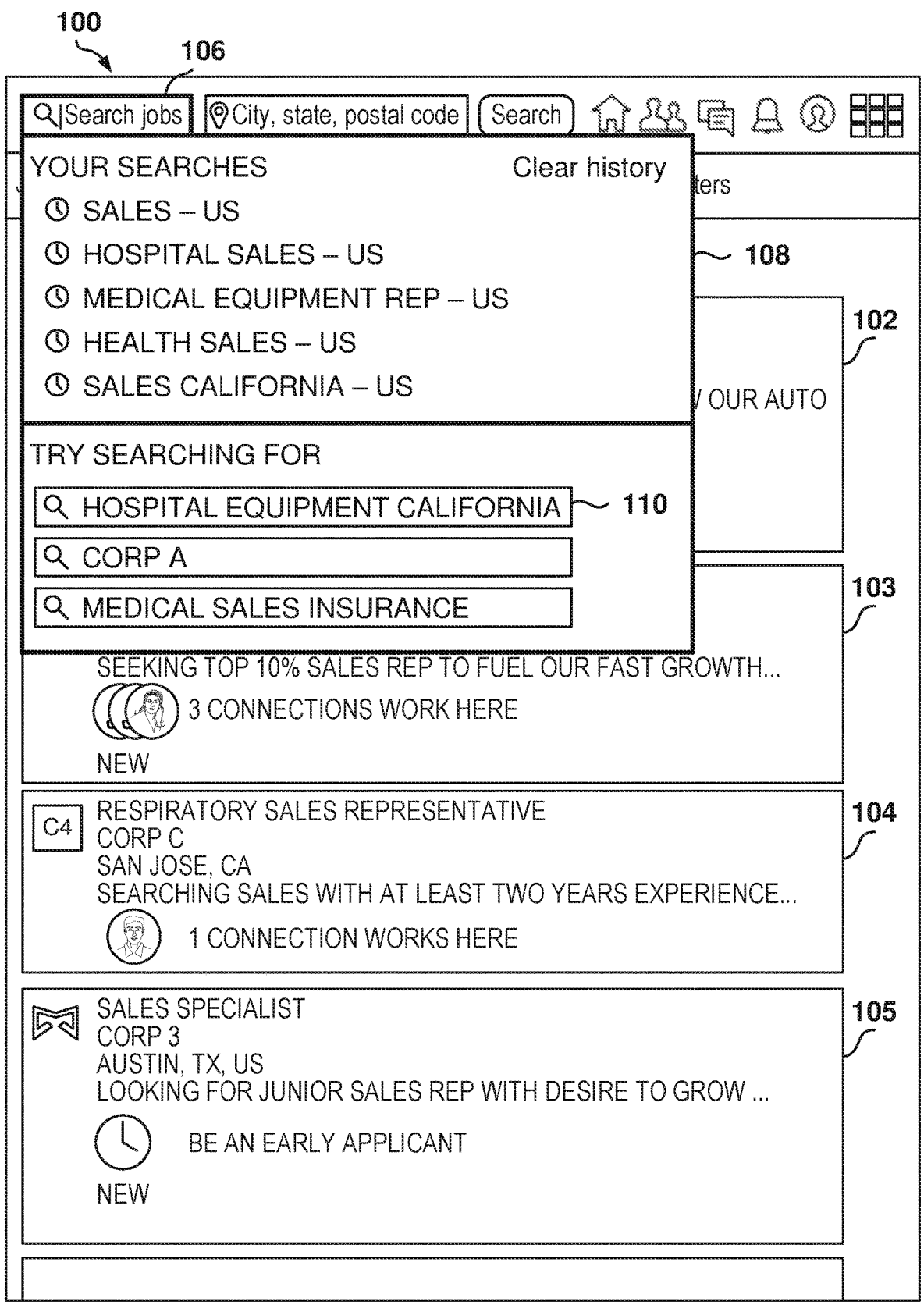
FIG. 1 is a screenshot of a user interface for job searching, according to some example embodiments.

Example methods, systems, and computer programs are directed to improved search methods based on career transition embeddings. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

In some search engines, such as a job search engine in an online service, the member of the online service is provided with suggestions, referred to herein as search starters, when doing searches to facilitate and improve the filtering of possible jobs for the member. This way, the member is able to just click on a search starter without having to enter query parameters. This accelerates the job search and improves member satisfaction because it makes the narrowing of possible jobs quick and easy.

In some implementations, a job search engine tracks career transitions of the member, where the career transitions indicate the changes from one job to the next during the professional career of the member. Embeddings of the career transitions are created based on similarity analysis for the career transitions of the members, and each embedding is represented by a vector. For example, the embeddings may be for companies and titles. The embeddings of companies that are similar (e.g., transitions between the companies happen often) will have vectors near each other, and the embeddings of titles that are similar (e.g., transitions between the titles happen often) will also have vectors near each other. Further, titles associated with a company will also have embeddings near the company embedding. When a member is searching for a job, the embeddings of the company and title of the member are used to improve the job search, such as by providing search starters for companies or titles of interest for the member based on the company or title embeddings proximate to the member's embeddings.

In some example embodiments, the online service is a professional social network, but the same principles may be applied to other online services and other social networks. Further, embodiments are presented with reference to job searches, but the same principles may be applied to other types of searches.

One general aspect includes a method that includes an operation for generating career transition vectors for members of an online service, each career transition vector comprising identifiers associated with the career transitions of each member. The method further includes operations for performing a similarity analysis of the career transition vectors to generate an embedding vector for each identifier, detecting access of a first member to a job search user interface, and selecting one or more top embedding vectors based on one or more embedding vectors of the first member. One or more search starters associated with the one or more top embedding vectors are generated, and the one or more search starters are presented on the job search user interface.

FIG. 1 is a screenshot of a user interface 100 for job searching, according to some example embodiments. In some example embodiments, the member may enter a query in search field 106 to search for jobs and the results (job posts 102-105) of the query are shown in the user interface 100. In other example embodiments, the online service provides job recommendations based on the profile and activities of the member.

In some example embodiments, when the member selects (e.g., places the cursor on) the search field 106, the online service presents a window 108 with search options that, when selected, will generate a search query without having to enter query words in the search field 106.

The search options in window 108 include previous searches entered by the member (e.g., sales in the United States of America) and search starters 110 suggested by the online service (e.g., "Hospital Equipment California," "Corp. A," "Medical Sales Insurance"). In other example embodiments, alerts may also be presented in the window 108, where the alerts correspond to job alerts based on criteria identified by the member. Each search starter 110 includes one or more words that are used as query parameters for a search query.

The online service aims at providing the best search starters 110 that correspond to the goals of the member based on the member profile and member history. The better the search starters 110 are, the more often the search starters 110 will be selected by the member. Further, the more search starters 110 selected, the faster and easier the job search will be for the member.

As the member scrolls down the user interface 100, more job posting recommendations are presented. In some example embodiments, the job posting recommendations are prioritized to present job postings in an estimated order of interest to the member.

For example, job posting 104 is for a "Respiratory Sales Representative" at company Corp C. The job posting 104 includes summary information, such as location, all or part of the job description, and other flags, such as if the job posting 102 is new.

It is noted that the embodiments illustrated in FIG. 1 are examples and do not describe every possible embodiment. Other embodiments may utilize different job-presentation layouts, including additional or less information for each job posting 102-105, etc. The embodiments illustrated in FIG. 1 should therefore not be interpreted to be exclusive or limiting, but rather illustrative.

Figure 2:
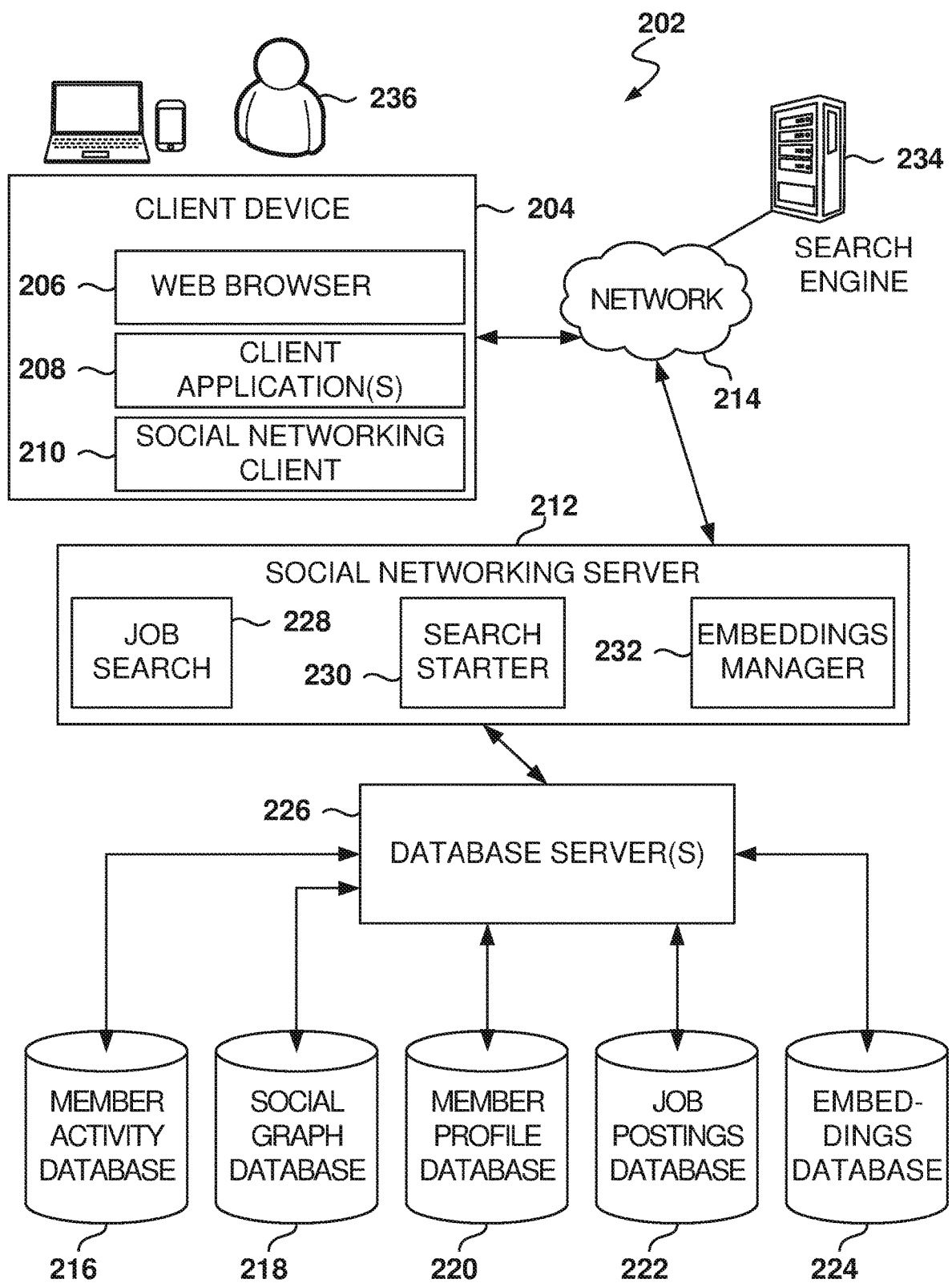
FIG. 2 is a block diagram illustrating a networked system, according to some example embodiments.

FIG. 2 is a block diagram illustrating a networked system, according to some example embodiments, including a social networking server 212, illustrating an example embodiment of a high-level client-server-based network architecture 202. Embodiments are presented with reference to an online service and, in some example embodiments, the online service is a social networking service.

The social networking server 212 provides server-side functionality via a network 214 (e.g., the Internet or a wide area network (WAN)) to one or more client devices 204. FIG. 2 illustrates, for example, a web browser 206, client application(s) 208, and a social networking client 210 executing on a client device 204. The social networking server 212 is further communicatively coupled with one or more database servers 226 that provide access to one or more databases 216-224.

The client device 204 may comprise, but is not limited to, a mobile phone, a desktop computer, a laptop, a portable digital assistant (PDA), a smart phone, a tablet, a netbook, a multi-processor system, a microprocessor-based or programmable consumer electronic system, or any other communication device that a member 236 may utilize to access the social networking server 212. In some embodiments, the client device 204 may comprise a display module (not shown) to display information (e.g., in the form of user interfaces). In further embodiments, the client device 204 may comprise one or more of touch screens, accelerometers, gyroscopes, cameras, microphones, Global Positioning System (GPS) devices, and so forth.

In one embodiment, the social networking server 212 is a network-based appliance that responds to initialization requests or search queries from the client device 204. One or more members 236 may be a person, a machine, or other means of interacting with the client device 204. In various embodiments, the member 236 is not part of the network architecture 202 but may interact with the network architecture 202 via the client device 204 or another means.

The client device 204 may include one or more applications (also referred to as "apps") such as, but not limited to, the web browser 206, the social networking client 210, and other client applications 208, such as a messaging application, an electronic mail (email) application, a news application, and the like. In some embodiments, if the social networking client 210 is present in the client device 204, then the social networking client 210 is configured to locally provide the user interface for the application and to communicate with the social networking server 212, on an as-needed basis, for data and/or processing capabilities not locally available (e.g., to access a member profile, to authenticate a member 236, to identify or locate other connected members 236, etc.). Conversely, if the social networking client 210 is not included in the client device 204, the client device 204 may use the web browser 206 to access the social networking server 212.

Further, while the client-server-based network architecture 202 is described with reference to a client-server architecture, the present subject matter is of course not limited to such an architecture, and could equally well find application in a distributed, or peer-to-peer, architecture system, for example.

In addition to the client device 204, the social networking server 212 communicates with the one or more database servers 226 and databases 216-224. In one example embodiment, the social networking server 212 is communicatively coupled to a member activity database 216, a social graph database 218, a member profile database 220, a job postings database 222, and an embeddings database 224. The databases 216-224 may be implemented as one or more types of databases including, but not limited to, a hierarchical database, a relational database, an object-oriented database, one or more flat files, or combinations thereof.

The member profile database 220 stores member profile information about members 236 who have registered with the social networking server 212. With regard to the member profile database 220, the member 236 may include an individual person or an organization, such as a company, a corporation, a nonprofit organization, an educational institution, or other such organizations.

In some example embodiments, when a member 236 initially registers to become a member 236 of the social networking service provided by the social networking server 212, the member 236 is prompted to provide some personal information, such as name, age (e.g., birth date), gender, interests, contact information, home town, address, spouse's and/or family members' names, educational background (e.g., schools, majors, matriculation and/or graduation dates, etc.), employment history (e.g., companies worked at, periods of employment for the respective jobs, job title), professional industry (also referred to herein simply as "industry"), skills, professional organizations, and so on. This information is stored, for example, in the member profile database 220. Similarly, when a representative of an organization initially registers the organization with the social networking service provided by the social networking server 212, the representative may be prompted to provide certain information about the organization, such as a company industry. This information may be stored, for example, in the member profile database 220.

As members 236 interact with the social networking service provided by the social networking server 212, the social networking server 212 is configured to monitor these interactions. Examples of interactions include, but are not limited to, commenting on posts entered by other members 236, viewing member profiles, editing or viewing a member 236's own profile, sharing content outside of the social networking service (e.g., an article provided by an entity other than the social networking server 212), updating a current status, posting content for other members 236 to view and comment on, posting job suggestions for the members 236, searching job postings, and other such interactions. In one embodiment, records of these interactions are stored in the member activity database 216, which associates interactions made by a member 236 with his or her member profile stored in the member profile database 220.

The job postings database 222 includes job postings offered by companies. Each job posting includes job-related information such as any combination of employer, job title, job description, requirements for the job posting, salary and benefits, geographic location, one or more job skills desired, day the job posting was posted, relocation benefits, and the like.

The embeddings database 224 includes career transition embeddings. An embedding is a vector associated with a data item such that embeddings of similar items will be proximate to each other and embedding of dissimilar items will be far away from each other. That is, the embeddings are situated in a multidimensional space and embedding proximity corresponds to similarity for the items associated with the embeddings. The proximity between embeddings may be measured using cosine similarity, in some embodiments, but other distances may be used for measuring proximity.

In some example embodiments, the embeddings correspond to items in members career transitions, and the embeddings may be associated with companies, titles, educational institutions, and education degrees. However, other data items may also be used for embeddings.

While the database server(s) 226 are illustrated as a single block, one of ordinary skill in the art will recognize that the database server(s) 226 may include one or more such servers. Accordingly, and in one embodiment, the database server(s) 226 implemented by the social networking service are further configured to communicate with the social networking server 212.

The social networking server 212 includes, among other modules, a job search module 228, a search starter 230, and an embeddings manager 232. Each of the modules may be implemented in software, hardware, or any combination of software and hardware.

The job search module 228 performs job searches for the members of the social network. The search starter module 230 generates search starters 110 for a member doing a job search, such as the search starters 110 illustrated in FIG. 1. The embeddings manager 232 generates the embeddings. In some example embodiments, the embeddings are career-transition embeddings which represent data items associated with career transitions of the member of the social network. More details regarding the generation and management of embeddings are provided below with reference to FIGS. 3-7.

The network architecture 202 may also include a search engine 234. Although only one search engine 234 is depicted, the network architecture 202 may include multiple search engines 234. Thus, the social networking server 212 may retrieve search results (and, potentially, other data) from multiple search engines 234. The search engine 234 may be a third-party search engine.

Figure 3:
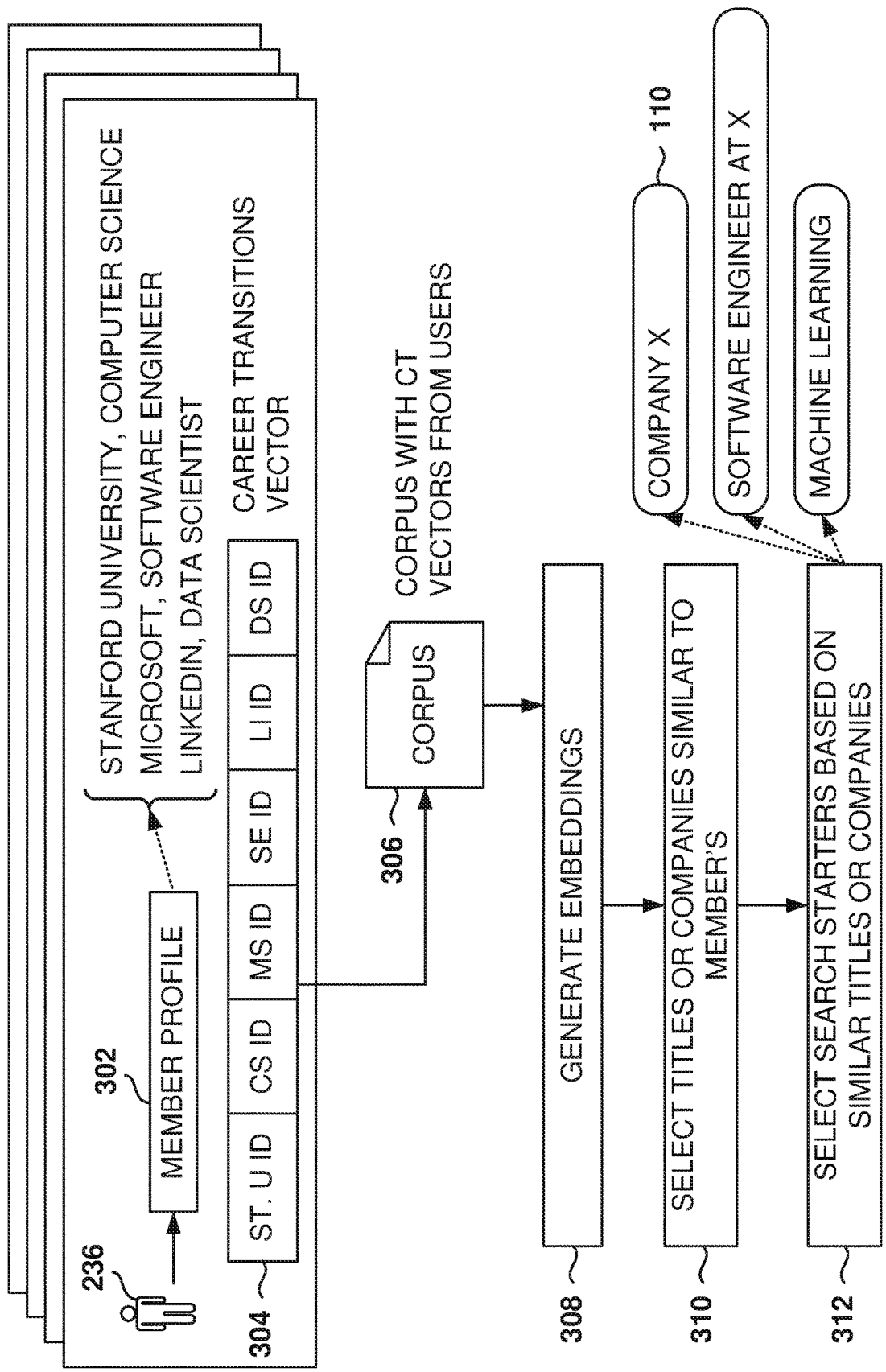
FIG. 3 illustrates the generation of career transition embeddings and selection of search starters, according to some example embodiments.

FIG. 3 illustrates the generation of career transition embeddings and selection of search starters 110, according to some example embodiments. A career transition refers to a change in employment of a member from a first job to a second job, or from an educational institution to a job or to another educational institution.

A career transition embedding is an embedding that has been calculated based on the career transitions of a member. Thus, in some example embodiments, the career transition embedding may include embeddings for a company, a title, an educational institution, and a degree.

In the illustrated example, the member 236 has a member profile 302 that holds information about the member 236. In the illustrated example, the member 236 attended Stanford University to obtain a computer science degree, then worked at Microsoft as a software engineer, followed by a job at LinkedIn as a data scientist.

A career transitions vector 304 is created by concatenating the information associated with the career changes of the member 236. In some example embodiments, the company, title, educational institution, and degree are represented with identifiers (e.g., an integer number or a real number). For example, each company in the social network has its unique company identifier (e.g., 4397).

The career transitions vector 304 is formed by concatenating the identifiers associated with the career transitions of the member. In general, the career transitions vector 304 has the format of $(a_1, b_1), (a_2, b_2), (a_3, b_3), \ldots (a_n, b_n)$, where $a_i$ is an identifier for an educational institution or a company and $b_i$ is an identifier for a degree or a title. The pairs of $(a_i, b_i)$ are included in chronological order, where the pair corresponding to the current occupation of the member is last in the list, but the opposite order may also be used. In some example embodiments, the career transitions vector 304 includes companies and titles without educational institutions. For the member 236, the career transitions vector 304 includes identifiers for Stanford University, computer science, Microsoft, software engineer, LinkedIn, and data scientist, represented as (STU ID, CS ID, MS ID, SE ID, LI ID, DS ID).

In some example embodiments, the career transitions may include only changes in employment without utilizing educational institutions and degrees.

The career transitions vector 304 is calculated for the members of the social network, and the combination of the career transitions vectors form a corpus 306. The corpus 306 is used to generate the embeddings (operation 308) based on similarities among the identifies in the career transition vectors in the corpus 306. For example, company and title embeddings are generated for a plurality of titles and companies. More details regarding the generation of embeddings are provided below with reference to FIG. 4.

At operation 310, titles or companies are selected that are similar to the member's current title or company. At operation 312, the search starters 110 are selected based on the titles, companies, or combinations thereof, selected at operation 310.

For example, the online service has detected that the embedding for company X is close to the embedding for the member's title (e.g., software engineer), which may occur, for example, when many members that have the same title work at company X or many members with that title have career transitions to company X. Then a search starter 110 may be created as "Company X" or "Software engineer at company X."

Further, the embedding of a title close to the embedding of the member's title may be used to generate a search starter 110. For example, the analysis of the embeddings has determined that "data scientist" is similar to "machine learning." Then a search starter 110 for "Machine learning" may be generated for the member.

Using career transitions assists the member in the search because career transition identify trends in the work transitions of members. For example, Corporation A has been hiring many data scientists from Corporation B, where a data scientist is currently working. By selecting "Corporation A" as a search starter 110, the data scientist can follow a search that has a higher probability of success than looking at other companies, given the current hiring trends of Corporation A. The higher probability of success benefits, not only the member, but also the social network, because a member finding a new job increases the member's satisfaction with the social network, and also because the social network may derive revenue from successful hires by companies that post jobs on the social network.

Figure 4:
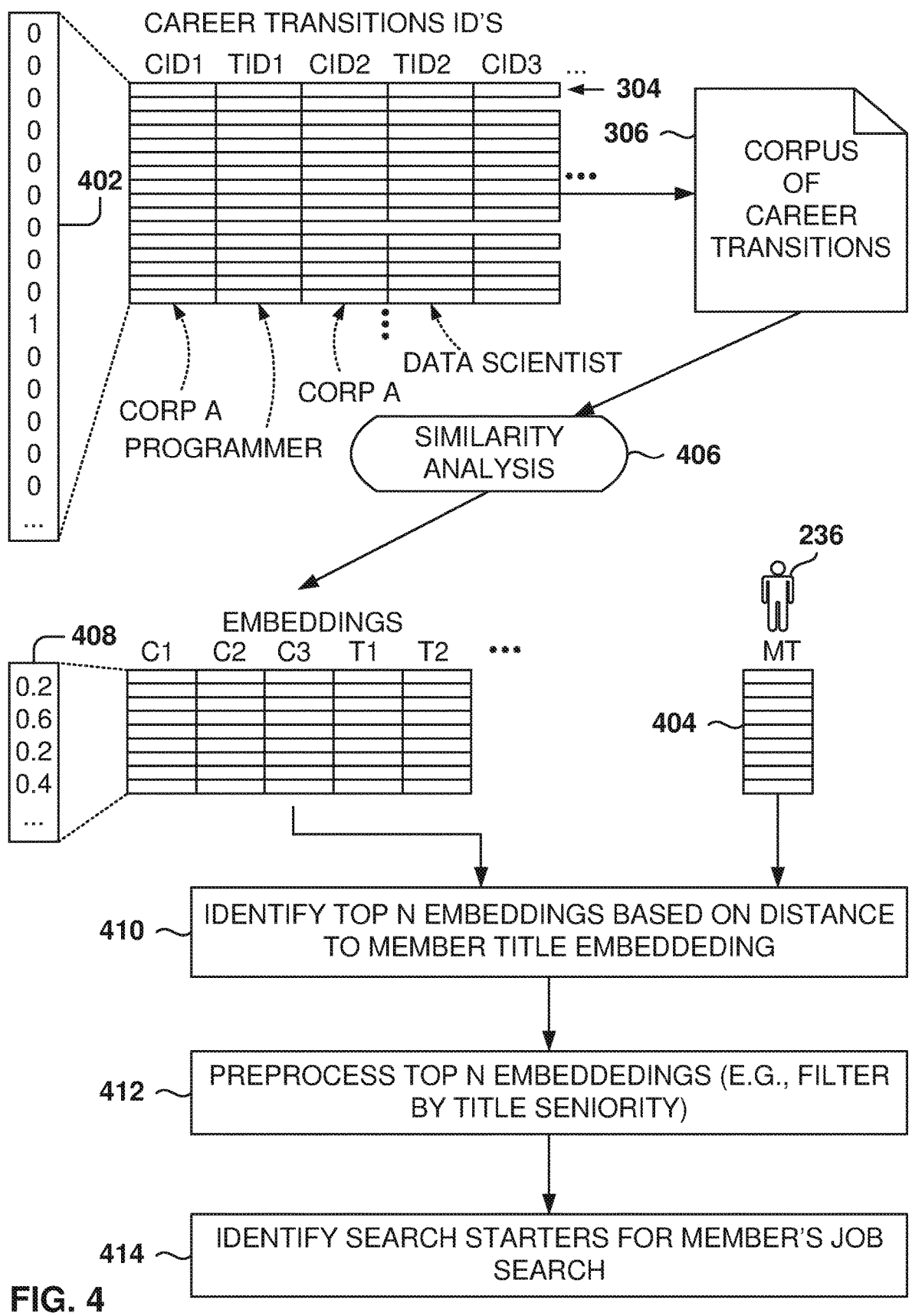
FIG. 4 illustrates a method for identifying start searchers based on career transition embeddings and member title, according to some example embodiments.

FIG. 4 illustrates a method for identifying start searchers based on career transition embeddings, according to some example embodiments. In one example embodiment, the vocabulary includes all identifiers associated with career transitions (e.g., companies, titles, educational institutions, degrees). Each identifier is represented as a vector the size of the vocabulary with a 1 corresponding to the identifier and the rest of the elements in the vector equal to 0. This representation is referred to as a bag-of-words vector representation. For example, the identifier for Corporation A has a vector 402 with a single 1 and the identifier for "programmer" also has a single 1 in the vector, but in a different position. Each row corresponds to a member and includes the career transition vector 304 of that member.

In one example embodiment, the vectors are condensed into a fixed dimension vector (e.g., with a dimension of 200, but other sizes are also possible) referred to as the embedding vector or simply the embedding. The elements of the embeddings are real numbers, where more than one element may be nonzero. For example, for the identifier of Corporation A there is a corresponding embedding 408 (0.21, 0.64, 0.43, . . . ) with a plurality of non-zero values.

The similarity analysis 406 finds similarities among identifiers by creating the embedding 408 for each identifier such that identifiers similar to other identifiers have embeddings near each other. For career transitions, identifiers are considered similar when the identifiers appear near each other often in the career transition vectors 304.

As used herein, the similarity coefficient, or simply the similarity, between a first embedding and a second embedding is a real number that quantifies how similar the first embedding is to the second embedding. In some example embodiments, the similarity coefficient range is [0-1], but other ranges are also possible. In some embodiments, cosine similarity is utilized to calculate the similarity coefficient between the embeddings, but other measurements may be utilized, such as the Euclidean distance.

In one example embodiment, the tool Word2vec is used to perform the similarity analysis, but other tools may also be used, such as Gensim, Latent Dirichlet Allocation (LDA), or Tensor flow. These models are shallow, two-layer neural networks that are trained to reconstruct linguistic contexts of words or numbers.

Word2vec takes as input a large corpus of words (e.g., identifiers) and produces a high-dimensional space (typically between a hundred and several hundred dimensions). Each unique word in the corpus is assigned a corresponding embedding 408 in the space. The embeddings 408 are positioned in the vector space such that words that share common contexts in the corpus are located in close proximity to one another in the space. In one example embodiment, each element of the embedding 408 is a real number. Each member is represented by the career transitions vector 304, which is treated as a sentence in the Word2vec algorithm.

In some example embodiments, the similarity analysis 406 is performed using the Word2vec algorithm with the following parameters: window size of 3, vector dim of 100, minimum frequency 0, continuous bag of words (CBOW), and negative sampling. In other example embodiments, other parameters may be used. The window size of 3 enables to capture the surrounding entities for a given identifier. Because the window size is 3, Word2vec is able to capture similarities due to career transitions because each career transition fits within the window. Therefore, career transitions that are frequent will cause the embeddings, associated with those career transitions, to be proximate to each other. In other example embodiments, script graph is used instead of CBOW.

The similarity analysis 406 performed with Word2vec generates the embedding vectors 408. The similarity between the embeddings 408 may then be measured, such as by using cosine similarity between the embeddings 408. In one example similarity analysis, the similarities among identifiers were measured. For description purposes, the name corresponding to the identifier is listed and the similarities are presented as a value from 0 to 1, where the higher the value, the higher the similarity.

A few examples so similarities are provided below. The first example is for items most similar to the company Amazon, and the most similar items are companies such as amazon-web-services (Amazon Web Services), amazon-co-uk (Amazon United Kingdom), amazon-services (Amazon Services), zulily (Zulily), offerup (OfferUp), etc. The respective similarity to Amazon is listed with each company. The additional examples are for similarities to company Lyft, company Bank of America, title "Manager," title "Software Engineer", title "Infantry," and Stanford University.

```
model.most_similar('amazon')
    [('amazon-web-services', 0.8175225257873535), ('amazon-co-uk',
    0.7938495874404907), ('amazon-services', 0.7668651342391968),
    ('zulily', 0.7616908550262451), ('offerup', 0.7603331208229065),
    ('expedia', 0.7420172691345215), ('zappos.com',
    0.7232667207717896), ('quidsi-inc.', 0.7201656103134155), ('boxed-
    com', 0.7178764343261719), ('colombiana-de-comercio-corbeta-
    alkosto-s.a', 0.714 7195339202881 )]
```

-continued

```
model.most_similar('lyft')
    [('uber-com', 0.8904404044151306), ('doordash',
    0.8328865766525269), ('postmates', 0.8058661818504333),
    ('taskrabbit', 0.80569261312484 7 4), ('home joy',
    0.7918387055397034 ), ('munchery', 0.778067827224 7314 ), ('square-
    -', 0.7770465016365051 ), ('shyp', 0.77 4357795715332), ('instacart',
    0.7639164924621582), ('airbnb', 0.7633422613143921 )]
model.most_similar('bank-of-america')
    [('mbna-uk', 0.82377582788467 41 ), ('bank-of-america-merrill-lynch',
    0.788714230060577 4 ), ('pennymac', 0.7850770354270935), ('mbna-
    america', 0.7791165709495544), ('fleet-bank', 0.7770377397537231),
    ('wellsfargo', 0.7719036340713501), ('citi', 0.7577400803565979),
    ('union-bank', 0.7561673521995544), ('jpmorgan-chase',
    0.7540738582611084), ('chase', 0.7512698173522949)]
model.most_similar('Manager')
    [('Lead_Manager', 0.7940750122070312), ('Senior_Manager',
    0.7622383832931519), ('Assistant_Manager', 0.7209792137145996),
    ('Manager_Positions', 0.7040057182312012), ('Training_Manager',
    0.7029016017913818), ('Middle_Manager', 0.7018022537231445),
    ('Senior_Assistant_Manager', 0.6966778039932251 ),
    ('Experienced_Manager', 0.6950021982192993), ('Acting_Manager',
    0.6784605979919434), ('Senior_Unit_Manager',
    0.6717320680618286)]
model.most_similar('Software_Engineer')
    [('Senior_Software_Engineer', 0.8954413533210754),
    ('Software_Developer', 0.8405628204345703),
    ('Lead_Software_Engineer', 0.8145108819007874),
    ('Software_Engineer_Team_Lead', 0.8062562942504883),
    ('System_Software_Engineer', 0.7974638342857361),
    ('Senior_Software_Engineer_Team_Lead', 0.7799490094184875),
    ('Software_Engineering_Intern', 0.778713583946228), ('Software_
    Development_Engineer', 0.777 4 704694 7 4 7925 ), ('Associate_
    Software_Engineer', 0.7731524 705886841 ), ('Software_Engineer
    _Project_Lead', 0.7709609270095825)]
model.most_similar('Infantry')
    [('Squad_Leader', 0.9189242124557 495), ('Combat_Engineer',
    0.9091840982437134 ), ('Military_Police_Officer',
    0.8885910511016846), ('Soldier', 0.8576993346214294),
    ('Non_Commissioned_Officer', 0.8327603340148926), ('Sergeant',
    0.8321186900138855), ('Platoon_Sergeant', 0.8257520198822021),
    ('Infantry_Soldier', 0.813075840473175), ('Crewman',
    0.8116452693939209), ('Corporal', 0.7846639752388)]
model.most_similar('Stanford_University')
    [('University_of_California,_Berkeley', 0.9273819923400879),
    ('Massachusetts_Institute_of_Technology', 0.9081741571426392),
    ('Princeton_University', 0.8880717754364014), ('Harvard_University',
    0.8824501037597656), ('University_of_California,_San_Diego',
    0.8817654848098755),
```

It is noted that the examples above show companies that are most similar to companies and titles that are most similar to titles. However, because of the career transition analysis, some titles may be similar to some companies and vice versa. For example, "Data Scientist" may be similar to company "LinkedIn" because there may be many transitions that include data scientists at LinkedIn.

Embeddings may also combined to identify similar embeddings. For example, a search for the most similar embeddings for a combination of Starbucks and Manager, and company Peace Coffee provided the following results:

```
model.most_similar(['starbucks','Manager'], ['peace-coffee'])
    [('Lead_Manager', 0.6463735103607178), ('Assistant_Manager',
    0.5884350538253784), ('Senior_Assistant_Manager',
    0.5755698680877686), ('Acting_Manager', 0.5691127777099609),
    ('Shift_Supervisor', 0.5678054690361023), ('Senior_Manager',
    0.567041277885437), ('Senior_Center_Manager',
    0.5652399063110352), ('Staff_Manager', 0.5607147216796875),
    ('starbucks-coffee-co', 0.5540317893028259), ('Server_Manager',
    0.5502579212188721)
```

In some example embodiments, the member title (MT) embedding 404 for the title of the member 236 is used to find search starters for the member. At operation 410, a predefined number of the top embeddings closer to the MT embedding 404 are identified based on the distance of the embeddings to the MT embedding 404. In some example embodiments, the number of top embeddings considered is 10, but in other embodiments, the number of top embeddings may be in the range from 5 to 50, although other number of top embeddings may be used. As discussed above, the distance to the MT embedding 404 may be calculated using cosine similarity or some other distance metric.

At operation 412, the top embeddings identified in operation 410 are preprocessed. The preprocessing may filter out some of the embeddings based on certain parameters for the member. For example, seniority may be used to filter out some of the embeddings or to rerank the value of the embeddings. Although the initial ranking of the top embeddings is based on the similarity coefficient, the preprocessing may change the ranking based on additional parameters and may also eliminate some of the embeddings from the list of top embeddings. For example, if the member is a senior data analyst, jobs associated with less-experienced titles are eliminated, such as data analyst intern.

Further, the preprocessing may be used to combine the top embeddings with other criteria related to the member, such as search query history. Thus, the search query history may be used to re-rank the top embeddings by considering the calculated similarity with the MT embedding 404 as well as the search history.

At operation 414, one or more search starters are identified from the top embeddings remaining after operation 412, and the identified search starters are presented to the member on the job-search user interface. The number of search starters presented may vary in the range from 1 to 10 or more.

In some example embodiments, the search starters are created by identifying the textual description of the corresponding identifiers and then presenting the textual description as possible search query. For example, if the embedding for identifier 346 is selected, the corresponding description (e.g., "software engineer") is used as the search starter.

In some example embodiments, search starters may be used that combine two of the top embeddings. For example, if the top embeddings include "Corporation A" and "Admin Assistant," a search starter is created for "Admin Assistant at Corporation A."

Figure 5:
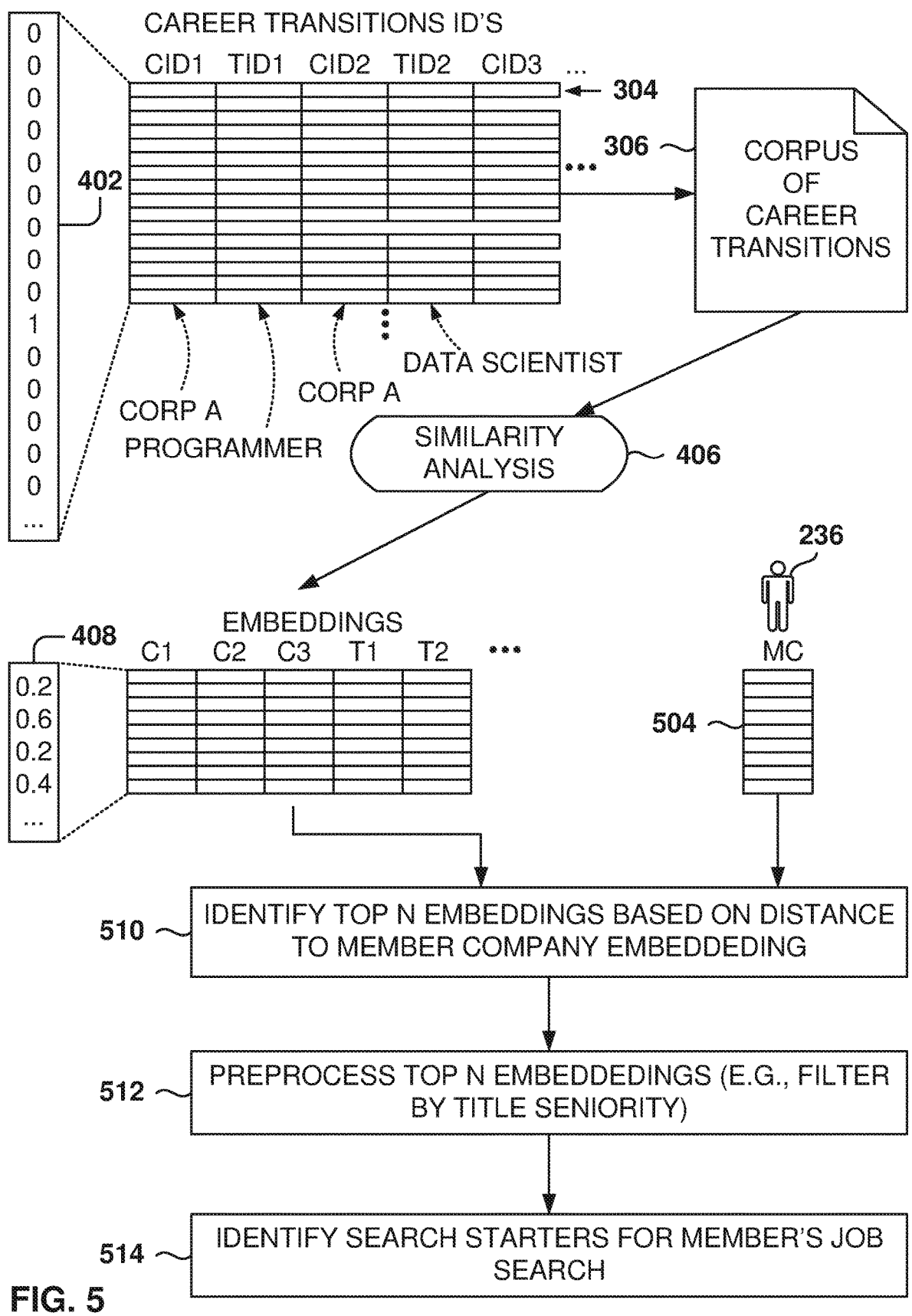
FIG. 5 illustrates a method for identifying start searchers based on career transition embeddings and member company, according to some example embodiments.

FIG. 5 illustrates a method for identifying start searchers based on career transition embeddings and member company, according to some example embodiments. In some example embodiments, the member company (MC) embedding 504 of the member 236 is used to select search starters.

FIG. 5 illustrates the same similarity analysis 406 as described above with reference to FIG. 4. However, the MC embedding 504 is used at operation 510 to identify the top embeddings based on the distance between the embeddings 408 and the MC embedding 504.

At operation 512, the top embeddings identified at operation 510 are preprocessed, as described above with reference to operation 412 of FIG. 4. Further, at operation 514 the search starters for the member's job search are identified, as described above with reference to operation 414 of FIG. 4.

For example, if the member is a forward at soccer team A, the search starters may include other teams similar to team A, such as other teams in the same league. Further, the title of the member maybe combined with some of the other teams to generate a search starter for "Forwards at team B."

Figure 6:
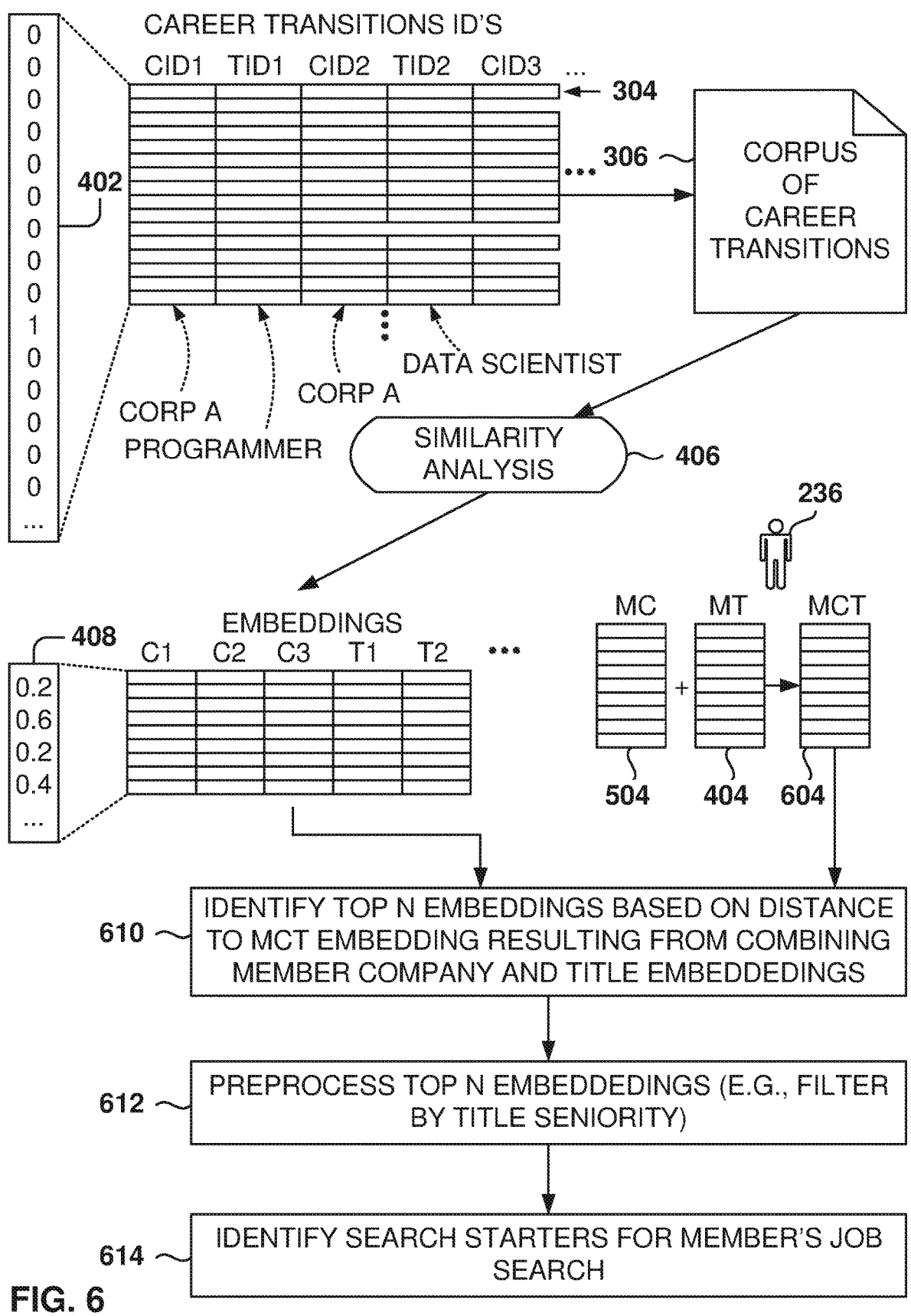
FIG. 6 illustrates a method for identifying start searchers based on career transition embeddings, member company, and member title, according to some example embodiments.

FIG. 6 illustrates a method for identifying start searchers based on career transition embeddings, member company, and member title, according to some example embodiments. In some example embodiments, both the MT embedding 404 and the MC embedding 504 are used to select the search starters.

In some example embodiments, the MT embedding 404 and the MC embedding 504 are combined to generate a member company title (MCT) embedding 604. The embeddings may be combined or merge in different ways, such as by calculating their average, adding the embeddings, or some other arithmetic vector calculation.

The MCT embedding 604 is used, at operation 610, to identify the top embeddings 408 based on the distance from the embeddings 408 to the MCT embedding 604. At operation 612, the top embeddings are preprocessed, as described above with reference to operation 412 of FIG. 4.

Further, at operation 614, the search starters are identified for the member's job search, as described above with reference to operation 414 of FIG. 4.

Since the MCT embedding 604 combines company and title, the search starters identified at operation 614 may include a combination of company, title, or company and title. Examples include, "Surgeon at Hospital X," "Pediatric Surgeon," and "Hospital Y."

Figure 7:
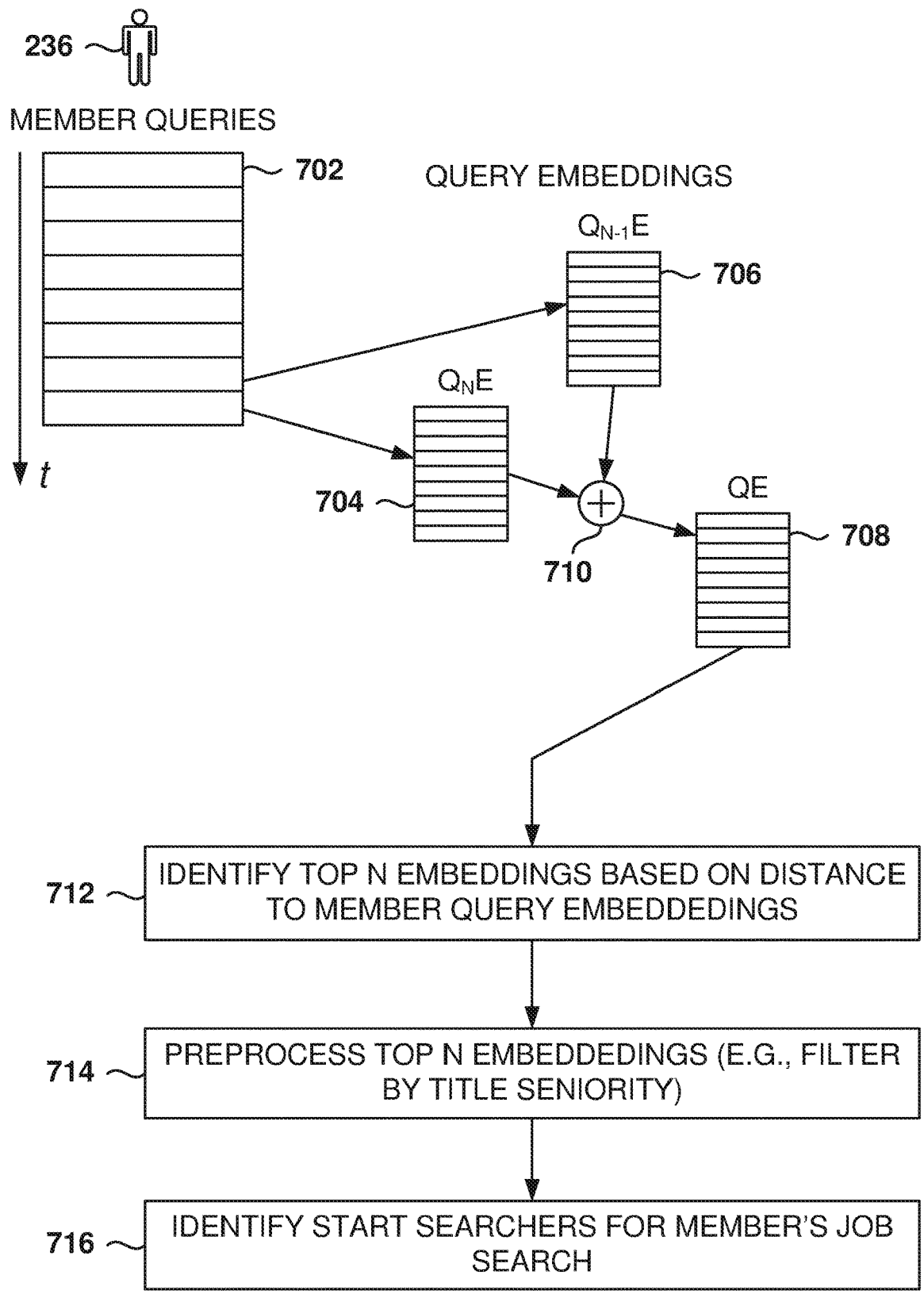
FIG. 7 illustrates a method for identifying search starters based on career transition embeddings and member query history, according to some example embodiments.

FIG. 7 illustrates a method for identifying search starters based on career transition embeddings and member query history, according to some example embodiments. In some example embodiments, embeddings may be generated for the member queries 702 submitted by the member 236.

The queries 702 are analyzed to identify embeddings of identifiers associated with the queries. For example, a query may be for "software engineer" and the query may be tagged with the embedding for the title of software engineer.

The embeddings from the queries may be used to select the search starters, but instead of using the member's company or title (as described above with reference to FIGS. 4-7) the query embeddings are used.

Additionally, the embeddings from the queries may be combined to perform the search for similar embeddings. In the example illustrated in FIG. 7, the most recent two queries are selected to identify embeddings for selecting search starters. For example, the most recent query is associated with embedding $Q_N E$ 704 and the previous query is associated with embedding $Q_{N-1} E$ 706.

The embedding $Q_N E$ 704 is combined 710 with embedding $Q_{N-1} E$ 706 to obtain query embedding (QN) 708. At operation 712, the top embeddings closest to QN 708 are identified, and at operation 714, the top embeddings are preprocessed, as discussed above with reference to operation 414 of FIG. 4.

At operation 716, the start searchers for the member are identified based on the top embeddings remaining after the preprocessing at operation 714.

In some example embodiments, the embeddings resulting from the queries may be combined with the embeddings from the member's company or title. For example, if the same embedding appears as a top possibility when considering the member's company, the member's title, and the member's queries, then that embedding has a high probability of being one of the best possible search starters and will be selected for presentation to the user.

Figure 8:
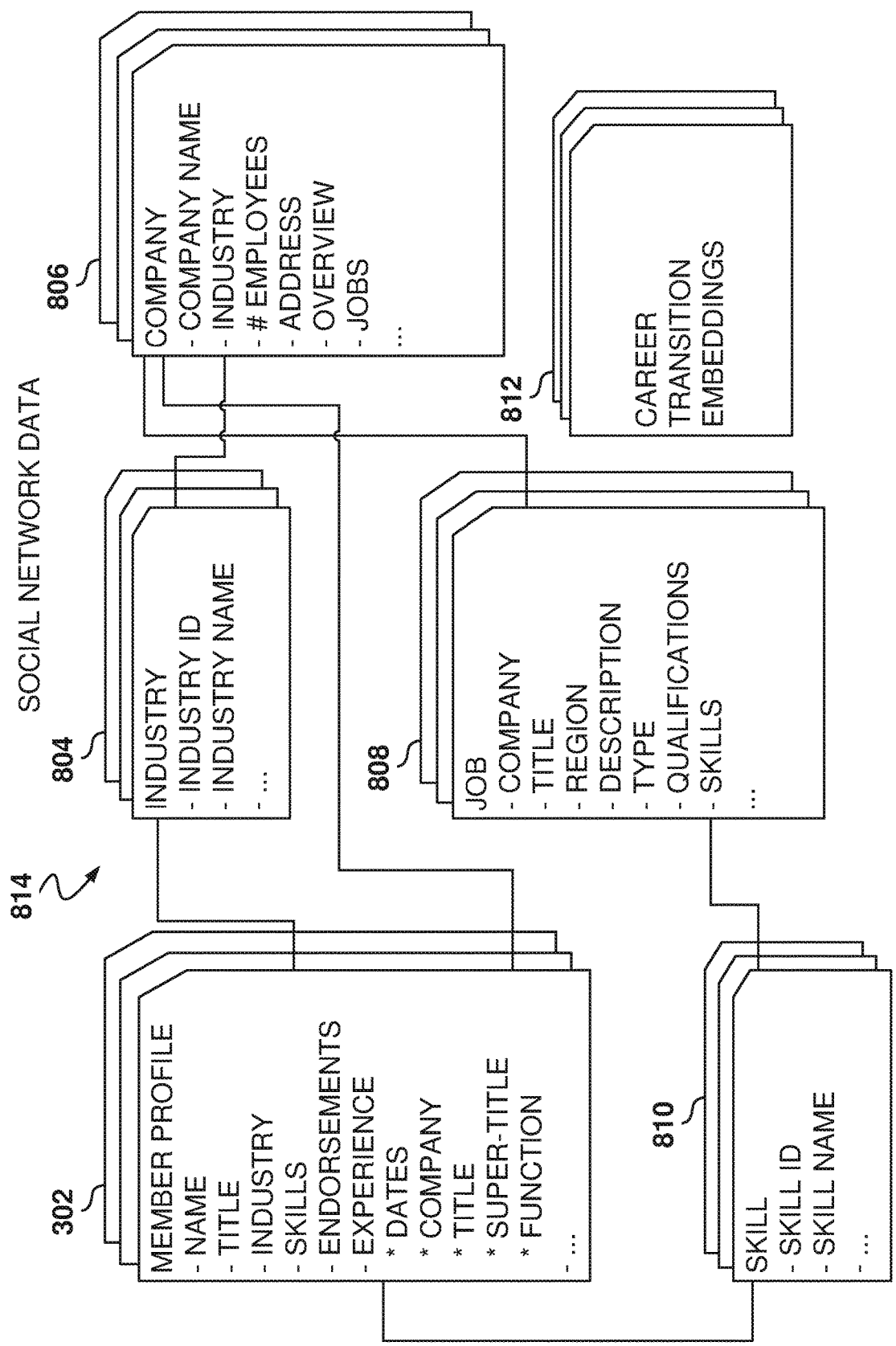
FIG. 8 illustrates data structures for storing job and member information, according to some example embodiments.

FIG. 8 illustrates data structures for storing social network data 814, according to some example embodiments. In some example embodiments, the social network data 814 comprises, at least, data for member profiles 302, industries 804, companies 806, skills 810, job postings 808, and career transition embeddings 812.

Each member in the social network has a member profile 302, which includes information about the member. The member profile 302 is configurable by the member and includes information about the member and about member activity in the social network (e.g., items liked, posts read).

In one example embodiment, the member profile 302 may include information in several categories, such as experience (including companies and titles), education, skills and endorsements, accomplishments, contact information, following, and the like. Skills include professional competences that the member has, and the skills may be added by the member or by other members of the social network. Example skills include C++, Java, Object Programming, Data Mining, Machine Learning, Data Scientist, and the like. Other members of the social network may endorse one or more of the skills and, in some example embodiments, the account is associated with the number of endorsements received for each skill from other members.

The member profile 302 includes member information, such as name, title (e.g., job title), industry (e.g., legal services), geographic region, jobs, skills and endorsements, and so forth. In some example embodiments, the member profile 302 also includes job-related data, such as employment history, jobs previously applied to, or jobs already suggested to the member (and how many times the job has been suggested to the member). The experience information includes information related to the professional experience of the member, and may include, for each job, dates, company, title, super-title, functional area, industry, etc. Within member profile 302, the skill information is linked to skill data 810, the employer information is linked to company data 806, and the industry information is linked to industry data 804. Other links between tables may be possible.

The career transition embeddings 812 include the embeddings associated with each of the members, where the embeddings are derived from performing the similarity analysis associated with career transitions, as described above.

The skill data 810 and endorsements includes information about professional skills that the member has identified as having been acquired by the member, and endorsements entered by other members of the social network supporting the skills of the member. Accomplishments include accomplishments entered by the member, and contact information includes contact information for the member, such as email and phone number.

The industry data 804 is a table for storing the industries identified in the social network. In one example embodiment, the industry data 804 includes an industry identifier (e.g., a numerical value or a text string), and an industry name, which is a text string associated with the industry (e.g., legal services).

In one example embodiment, the company data 806 includes company information, such as company name, industry associated with the company, number of employees, address, overview description of the company, job postings, and the like. In some example embodiments, the industry is linked to the industry data 804.

The skill data 810 is a table for storing the different skills identified in the social network. In one example embodiment, the skill data 810 includes a skill identifier (ID) (e.g., a numerical value or a text string) and a name for the skill. The skill identifier may be linked to the member profile 302 and job data 808.

In one example embodiment, job data 808 includes data for jobs posted by companies in the social network. The job data 808 includes one or more of a title associated with the job (e.g., software developer), a company that posted the job, a geographic region for the job, a description of the job, job type (e.g., full time, part time), qualifications required for the job, and one or more skills. The job data 808 may be linked to the company data 806 and the skill data 810.

In some embodiments, the social network imports jobs from other websites, such as the jobs page of the company, and those job postings may include an employment status (e.g., part-time, in-house). This information may also be used as features for the machine-learning model.

Additionally, some members may enter salary data in their profiles, and the salary data may be entered as hourly or salaried. This signal may also be used as a feature for the machine-learning model.

The social network data 814 may be combined to assist in the job search. For example, features and other job metadata may be extracted from a given job post, such as seniority required for the job (e.g., from apprentice to senior or master). As the member views different job openings, an inference may be made that the member is searching for entry-level jobs when the guest user tends to only view entry-level jobs. Therefore, the seniority of the member may be inferred based on the view patterns, and the job search will give higher priority to entry-level job posts for presentation to the guest member.

It is noted that the embodiments illustrated in FIG. 8 are examples and do not describe every possible embodiment. Other embodiments may utilize different data structures, fewer data structures, combine the information from two data structures into one, add additional or fewer links among the data structures, and the like. The embodiments illustrated in FIG. 8 should therefore not be interpreted to be exclusive or limiting, but rather illustrative.

Figure 9:
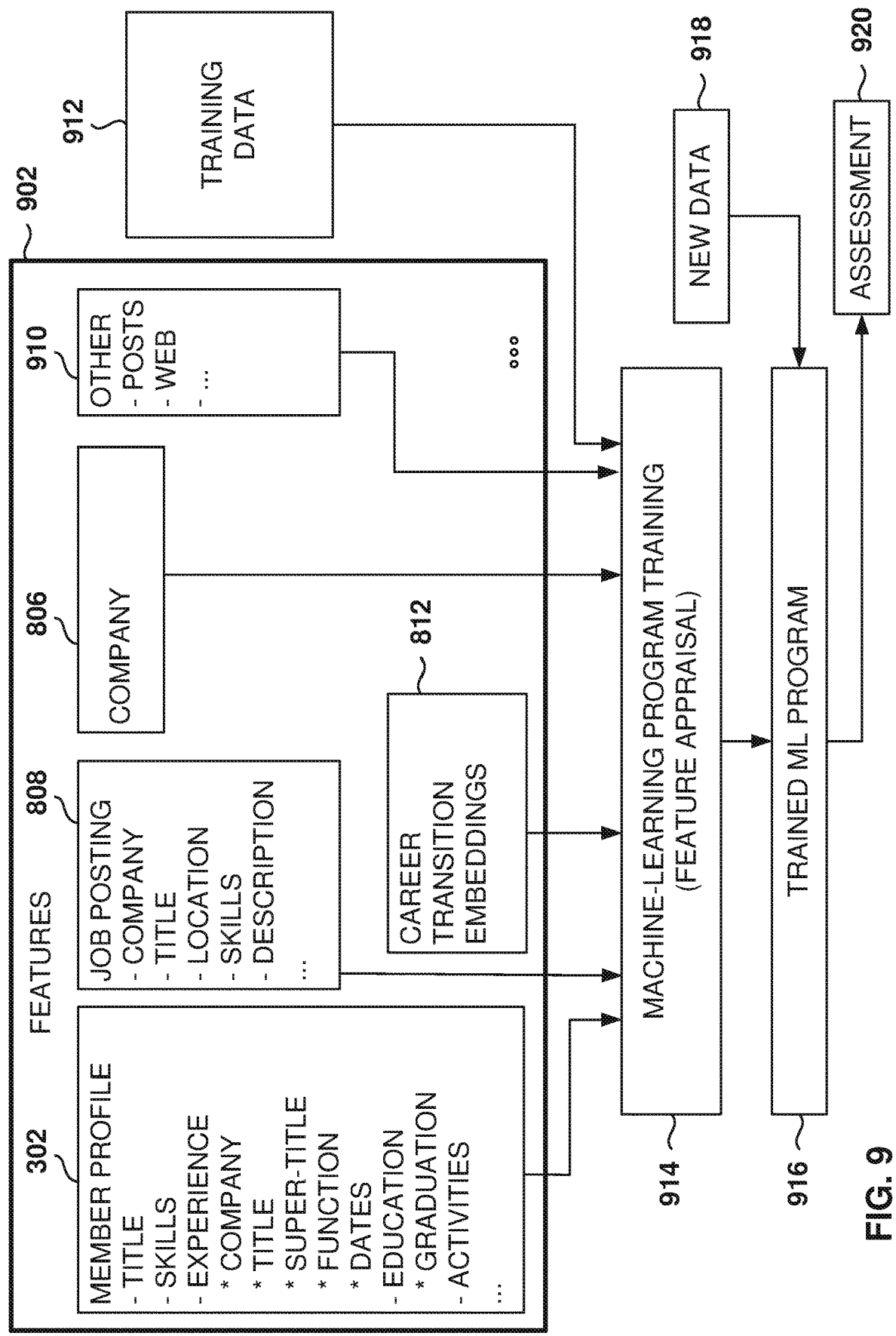
FIG. 9 illustrates the training and use of a machine-learning program, according to some example embodiments.

FIG. 9 illustrates the training and use of a machine-learning program, according to some example embodiments. In some example embodiments, machine-learning programs (MLP), also referred to as machine-learning algorithms or tools, are utilized to perform operations associated with searches, such as job searches or identifying search starters.

Machine learning is a field of study that gives computers the ability to learn without being explicitly programmed. Machine learning explores the study and construction of algorithms, also referred to herein as tools, that may learn from existing data and make predictions about new data. Such machine-learning tools operate by building a model from example training data 912 in order to make data-driven predictions or decisions expressed as outputs or assessments 920. Although example embodiments are presented with respect to a few machine-learning tools, the principles presented herein may be applied to other machine-learning tools.

In some example embodiments, different machine-learning tools may be used. For example, Logistic Regression (LR), Naive-Bayes, Random Forest (RF), neural networks (NN), deep neural networks (DNN), matrix factorization, and Support Vector Machines (SVM) tools may be used for classifying or scoring job postings.

Two common types of problems in machine learning are classification problems and regression problems. Classification problems, also referred to as categorization problems, aim at classifying items into one of several category values (for example, is this object an apple or an orange?). Regression algorithms aim at quantifying some items (for example, by providing a value that is a real number). The machine-learning algorithms utilize the training data 912 to find correlations among identified features 902 that affect the outcome.

The machine-learning algorithms utilize features for analyzing the data to generate assessments 920. A feature 902 is an individual measurable property of a phenomenon being observed. The concept of feature is related to that of an explanatory variable used in statistical techniques such as linear regression. Choosing informative, discriminating, and independent features is important for effective operation of the MLP in pattern recognition, classification, and regression. Features may be of different types, such as numeric, strings, and graphs.

In one example embodiment, the features 902 may be of different types and may include one or more of features for member 302, job posting 808, company 806, career transition embeddings 812, and other features 910 (member posts, web activity, followed companies, etc.). The features 902 may include all or part of the social network data 814, as described above with reference to FIG. 8. The data sources include member standardized data, jobs standardized data, member connections, member employment preferences, job views, job applied, job information, salary information, etc.

The machine-learning algorithms utilize the training data 912 to find correlations among the identified features 902 that affect the outcome or assessment 920. In some example embodiments, the training data 912 includes known data for one or more identified features 902 and one or more outcomes, such as a score for a job posting when ranking job postings during a job search.

With the training data 912 and the identified features 902, the machine-learning tool is trained at operation 914. The machine-learning tool appraises the value of the features 902 as they correlate to the training data 912. The result of the training is the trained machine-learning program 916.

When the machine-learning program 916 is used to perform an assessment, new data 918 is provided as an input to the trained machine-learning program 916, and the machine-learning program 916 generates the assessment 920 as output. For example, the machine-learning program may be used to provide a ranking score for a search starter, and the ranking score may be used to sort the search starters and then select which search starters are presented to the member.

Further, another machine-learning program may be used to provide a ranking score for a job post, and the ranking score may be used to sort the data results before presentation to the member.

In some example embodiments, part of the data (e.g., 90%) is used to train the machine-learning program and the rest is reserved for testing and validation. In some example embodiments, the model output is evaluated sampling results and manually validating these results. The results may be evaluated by human judges or may be evaluated by asking members of the social network directly to confirm the validity of the predictions, or by asking the employers to confirm the predictions for the given title or titles. By evaluating the sample results, it is possible to determine the accuracy of the predictions by the model.

Figure 10:
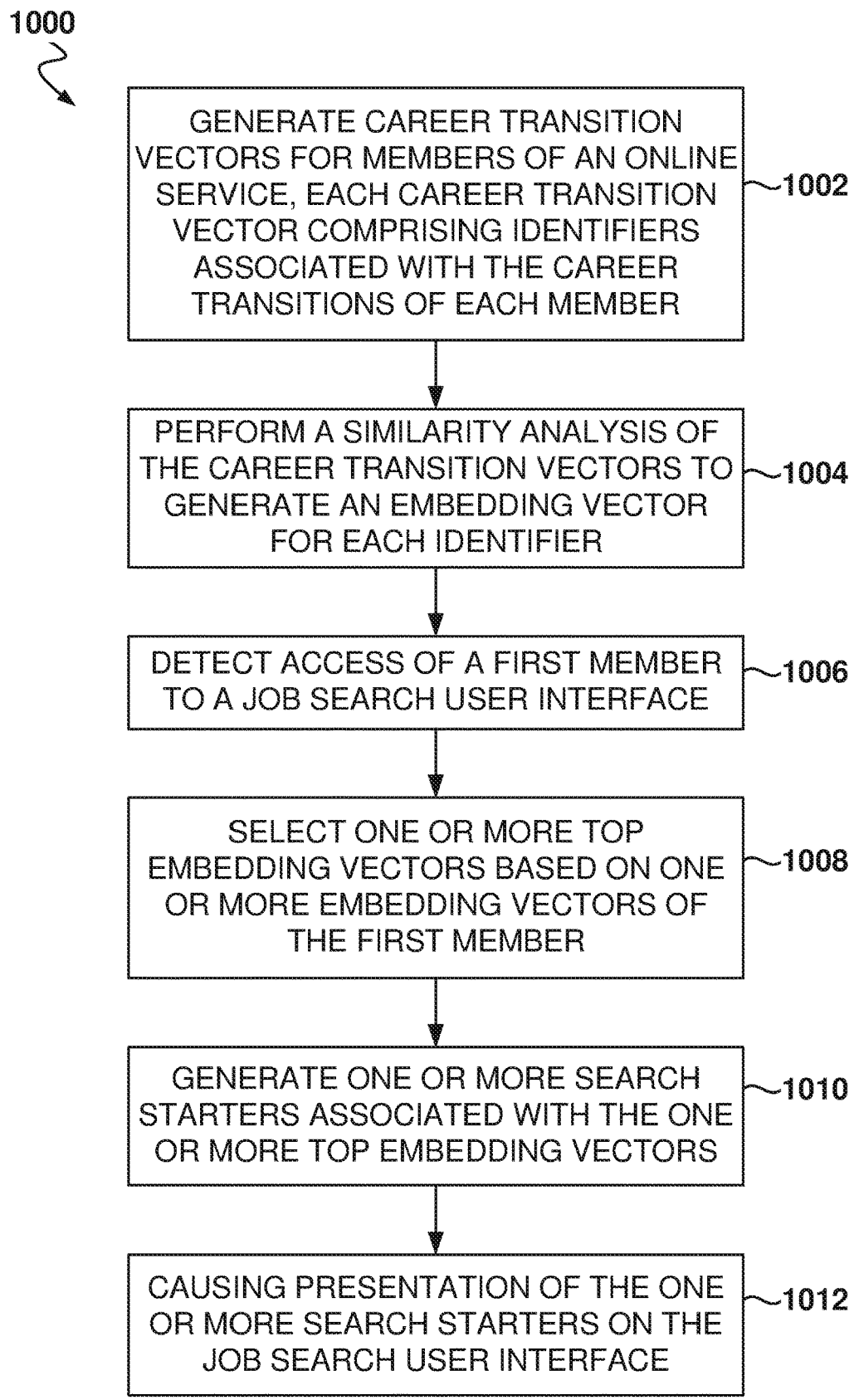
FIG. 10 is a flowchart of a method, according to some example embodiments, for data selection based on career transition embeddings.

FIG. 10 is a flowchart of a method 1000, according to some example embodiments, for data selection based on career transition embeddings. While the various operations in this flowchart are presented and described sequentially, one of ordinary skill will appreciate that some or all of the operations may be executed in a different order, be combined or omitted, or be executed in parallel.

Operation 1002 is for generating, by one or more processors, career transition vectors for members of an online service. Each career transition vector comprises identifiers associated with the career transitions of each member.

From operation 1002, the method 1000 flows to operation 1004, where the one or more processors perform a similarity analysis of the career transition vectors to generate an embedding vector for each identifier.

Further, from operation 1004, the method 1000 flows to operation 1006 for detecting, by the one or more processors, access of a first member to a job search user interface.

From operation 1006, the method 1000 flows to operation 1008, where the one or more processors select one or more top embedding vectors based on one or more embedding vectors of the first member.

At operation 1010, the one or more processors generate one or more search starters associated with the one or more top embedding vectors, and at operation 1012, the one or more processors cause presentation of the one or more search starters on the job search user interface.

In one example, the identifiers are selected from a group consisting of company where the member works, title of the member, educational institution, and degree.

In one example, generating the career transition vectors further comprises forming the career transition vector of a given member by concatenating one or more pairs of company identifier of a company where the given member worked and title of the member at the company where the given member worked.

In one example, generating the career transition vectors further comprises: forming the career transition vector of a given member by concatenating one or more pairs, each pair comprising one of: identifier of an educational institution of the given member and identifier of degree obtained at the educational institution; or company identifier of a company where the given member worked and title of the member at the company where the given member worked.

In one example, performing the similarity analysis further comprises: generating a corpus with the career transition vectors of the members, and analyzing the corpus to generate the embedding vector for each identifier such that identifiers that are similar have embedding vectors near each other.

In one example, each search starter includes one or more words used as query parameters for a search query.

In one example, generating one or more search starters further comprises, for each top embedding vector: translating an identifier associated with top embedding vector to a text string, and forming the search starter based on the text string.

In one example, selecting one or more top embedding vectors further comprises: identifying a predetermined number of embedding vectors that are closest to an embedding vector of a title of the first member, and selecting one or more embedding vectors from the predetermined number of embedding vectors as the one or more top embedding vectors.

In one example, selecting one or more top embedding vectors further comprises: identifying a predetermined number of embedding vectors that are closest to an embedding vector of a company of the first member, and selecting one or more embedding vectors from the predetermined number of embedding vectors as the one or more top embedding vectors.

In one example, selecting one or more top embedding vectors further comprises: combining an embedding vector of a title of the first member and an embedding vector of a company of the first member to obtain a combination embedding vector, identifying a predetermined number of embedding vectors that are closest to the combination embedding vector, and selecting one or more embedding vectors from the predetermined number of embedding vectors as the one or more top embedding vectors.

Another general aspect is for a system that includes a memory comprising instructions and one or more computer processors. The instructions, when executed by the one or more computer processors, cause the system to perform operations comprising: generating, by one or more processors, career transition vectors for members of an online service, each career transition vector comprising identifiers associated with the career transitions of each member; performing, by the one or more processors, a similarity analysis of the career transition vectors to generate an embedding vector for each identifier; detecting, by the one or more processors, access of a first member to a job search user interface; selecting, by the one or more processors, one or more top embedding vectors based on one or more embedding vectors of the first member; and generating, by the one or more processors, one or more search starters associated with the one or more top embedding vectors; and causing, by the one or more processors, presentation of the one or more search starters on the job search user interface.

In yet another general aspect, a machine-readable storage medium (e.g., a non-transitory storage medium) includes instructions that, when executed by a machine, cause the machine to perform operations comprising: generating, by one or more processors, career transition vectors for members of an online service, each career transition vector comprising identifiers associated with the career transitions of each member; performing, by the one or more processors, a similarity analysis of the career transition vectors to generate an embedding vector for each identifier; detecting, by the one or more processors, access of a first member to a job search user interface; selecting, by the one or more processors, one or more top embedding vectors based on one or more embedding vectors of the first member; and generating, by the one or more processors, one or more search starters associated with the one or more top embedding vectors; and causing, by the one or more processors, presentation of the one or more search starters on the job search user interface.

Figure 11:
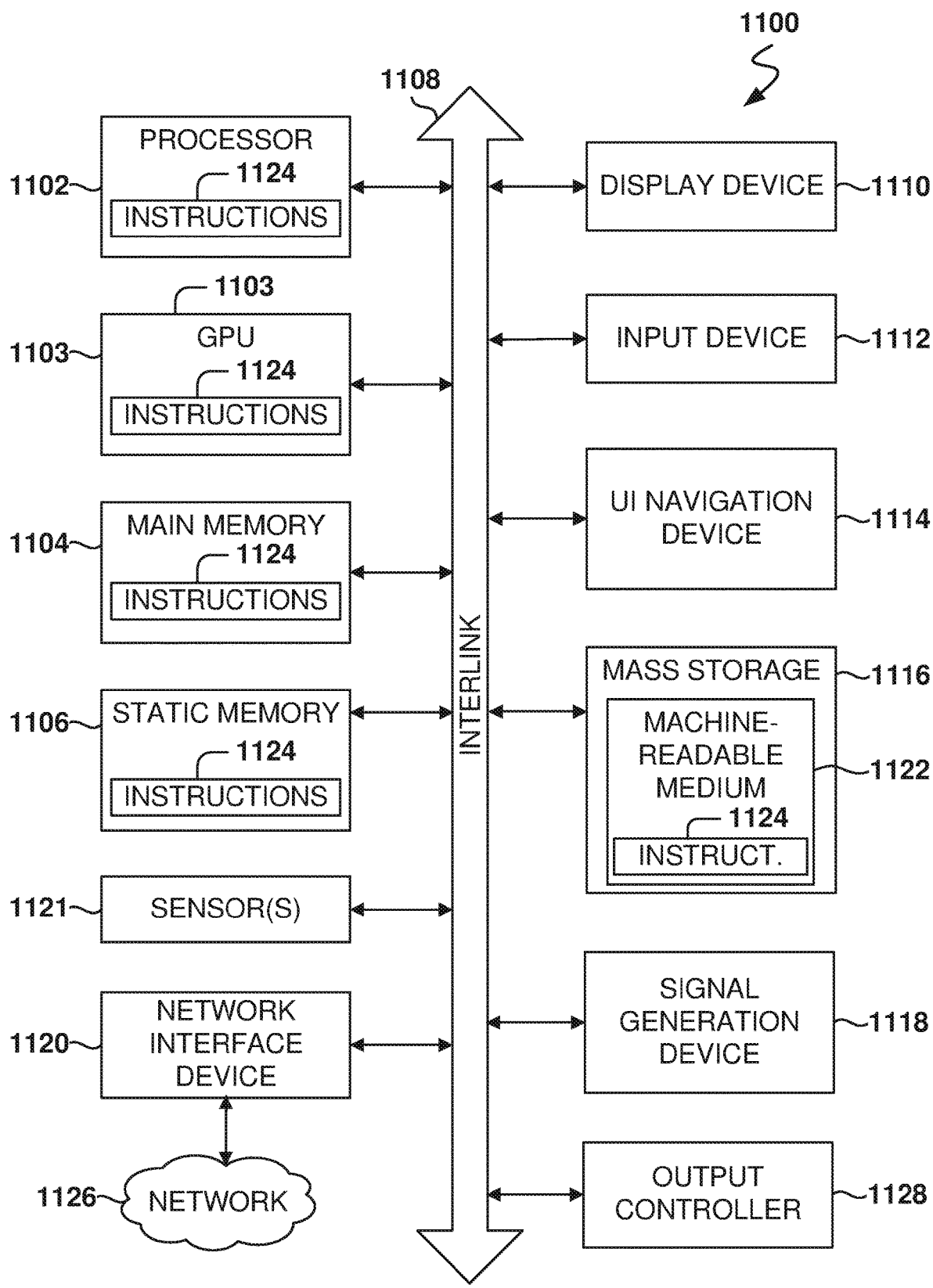
FIG. 11 is a block diagram illustrating an example of a machine 900 upon or by which one or more example process embodiments described herein may be implemented or controlled.

FIG. 11 is a block diagram illustrating an example of a machine 1100 upon or by which one or more example process embodiments described herein may be implemented or controlled. In alternative embodiments, the machine 1100 may operate as a standalone device or may be connected (e.g., networked) to other machines. In a networked deployment, the machine 1100 may operate in the capacity of a server machine, a client machine, or both in server-client network environments. In an example, the machine 1100 may act as a peer machine in a peer-to-peer (P2P) (or other distributed) network environment. Further, while only a single machine 1100 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, a number of components, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, by moveable placement of invariant massed particles, etc.) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 1100 may include a hardware processor 1102 (e.g., a central processing unit (CPU), a hardware processor core, or any combination thereof), a graphics processing unit (GPU) 1103, a main memory 1104, and a static memory 1106, some or all of which may communicate with each other via an interlink (e.g., bus) 1108. The machine 1100 may further include a display device 1110, an alphanumeric input device 1112 (e.g., a keyboard), and a user interface (UI) navigation device 1114 (e.g., a mouse). In an example, the display device 1110, alphanumeric input device 1112, and UI navigation device 1114 may be a touch screen display. The machine 1100 may additionally include a mass storage device (e.g., drive unit) 1116, a signal generation device 1118 (e.g., a speaker), a network interface device 1120, and one or more sensors 1121, such as a Global Positioning System (GPS) sensor, compass, accelerometer, or another sensor. The machine 1100 may include an output controller 1128, such as a serial (e.g., universal serial bus (USB)), parallel, or other wired or wireless (e.g., infrared (IR), near field communication (NFC), etc.) connection to communicate with or control one or more peripheral devices (e.g., a printer, card reader, etc.).

The mass storage device 1116 may include a machine-readable medium 1122 on which is stored one or more sets of data structures or instructions 1124 (e.g., software) embodying or utilized by any one or more of the techniques or functions described herein. The instructions 1124 may also reside, completely or at least partially, within the main memory 1104, within the static memory 1106, within the hardware processor 1102, or within the GPU 1103 during execution thereof by the machine 1100. In an example, one or any combination of the hardware processor 1102, the GPU 1103, the main memory 1104, the static memory 1106, or the mass storage device 1116 may constitute machine-readable media.

While the machine-readable medium 1122 is illustrated as a single medium, the term "machine-readable medium" may include a single medium, or multiple media, (e.g., a centralized or distributed database, and/or associated caches and servers) configured to store the one or more instructions 1124.

The term "machine-readable medium" may include any medium that is capable of storing, encoding, or carrying instructions 1124 for execution by the machine 1100 and that cause the machine 1100 to perform any one or more of the techniques of the present disclosure, or that is capable of storing, encoding, or carrying data structures used by or associated with such instructions 1124. Non-limiting machine-readable medium examples may include solid-state memories, and optical and magnetic media. In an example, a massed machine-readable medium comprises a machine-readable medium 1122 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory EPROM)) and flash memory devices; magnetic disks, such as internal hard disks and removable disks; magneto-optical disks; and CD-ROM and DVD-ROM disks.

The instructions 1124 may further be transmitted or received over a communications network 1126 using a transmission medium via the network interface device 1120.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
   generating, by one or more processors, a plurality of career transition vectors, each career transition vector of the plurality of career transition vectors generated by concatenating identifiers associated with career transitions of a member as indicated in a member profile of the member;
   with a neural network, processing the plurality of career transition vectors to generate for each identifier an embedding in a common embedding space;
   detecting, by the one or more processors, access of a first member to a job search user interface;
   selecting, by the one or more processors, one or more identifiers having an associated embedding that is close in distance to an embedding associated with a profile attribute in a member profile of the first member;
   generating, by the one or more processors, one or more search starters associated with the one or more selected identifiers; and
   causing, by the one or more processors, presentation of the one or more search starters on the job search user interface.

2. The method as recited in claim 1, wherein the identifiers are selected from a group consisting of:
   an identifier of a company name of a company at which the member is, or was, employed;
   an identifier of a title of the member;
   an identifier of an educational institution and an identifier of a degree.

3. The method as recited in claim 1, wherein generating the plurality of career transition vectors further comprises:
   forming a career transition vector in the plurality of career transition vectors by concatenating pairs of an identifier of a company name of a company with which the member is, or was, employed, and an identifier of a title of the member while employed by the company.

4. The method as recited in claim 1, wherein generating the plurality of career transition vectors further comprises:
   forming a career transition vector in the plurality of career transition vectors by concatenating pairs of identifiers, each pair comprising one of:
   an identifier of an educational institution attended by the member and an identifier of a degree obtained at the educational institution; or
   an identifier of a company name of a company with which the member is, or was, employed, and an identifier of a title of the member while employed with the company.

5. The method as recited in claim 1,
   wherein, processing the plurality of career transition vectors with the neural network to generate for each identifier an embedding in a common embedding space comprises:
   processing the career transition vectors to generate, for each identifier, a vector representation of the identifier, with identifiers frequently occurring together as part of a career transition having vector representations that are close in distance to one another.

6. The method as recited in claim 1, wherein each search starter includes one or more words used as query parameters for a search query.

7. The method as recited in claim 6, wherein generating one or more search starters further comprises:
   for each of the one or more identifiers selected for having an embedding that is close in distance to an embedding associated with a profile attribute of the first member,
   i) translating an embedding associated with the selected identifier to a text string and ii) forming the search starter based on the text string.

8. The method as recited in claim 1, wherein selecting one or more identifiers having an associated embedding that is close in distance to an embedding associated with a profile attribute of the first member further comprises:
   selecting a predetermined number of identifiers having associated embeddings that are close in distance to an embedding of a title of the first member.

9. The method as recited in claim 1, wherein selecting one or more identifiers having an associated embedding that is close in distance to an embedding associated with a profile attribute of the first member further comprises:
   selecting a predetermined number of identifiers having associated embeddings that are close in distance to an embedding of a company name of a company at which the first member is employed, as indicated in a member profile of the member.

10. The method as recited in claim 1, wherein selecting one or more identifiers having an associated embedding that is close in distance to an embedding associated with a profile attribute of the first member further comprises:

combining an embedding of a title of the first member with an embedding of a company name of a company at which the first member is employed, to obtain a combined embedding; and selecting a predetermined number of embeddings, associated with a combination of identifiers, that are closest in distance to the combined embedding.

11. A system comprising:

a memory comprising instructions; and one or more computer processors, wherein the instructions, when executed by the one or more computer processors, cause the system to perform operations comprising:

generating, by one or more processors, a plurality of career transition vectors, each career transition vector of the plurality of career transition vectors generated by concatenating identifiers associated with career transitions of a member as indicated in a member profile of the member;

with a neural network, processing the plurality of career transition vectors to generate for each identifier an embedding in a common embedding space;

detecting, by the one or more processors, access of a first member to a job search user interface;

selecting, by the one or more processors, one or more identifiers having an associated embedding that is close in distance to an embedding associated with a profile attribute in a member profile of the first member;

generating, by the one or more processors, one or more search starters associated with the one or more selected identifiers; and causing, by the one or more processors, presentation of the one or more search starters on the job search user interface.

12. The system as recited in claim 11, wherein the identifiers are selected from a group consisting of:

an identifier of a company name at which the member is, or was, employed;

an identifier of a title of the member;

an identifier of an educational institution and an identifier of a degree.

13. The system as recited in claim 11, wherein generating the plurality of career transition vectors further comprises:

forming a career transition vector in the plurality of career transition vectors by concatenating pairs of identifiers, each pair comprising one of:

an identifier of a company name of a company with which the member is, or was employed, and an identifier of a title of the member while employed with the company.

14. The system as recited in claim 11, wherein generating the plurality of career transition vectors further comprises:

forming a career transition vector in the plurality of career transition vectors by concatenating pairs of identifiers, each pair comprising one of:

an identifier of an educational institution attended by the member and an identifier of a degree obtained at the educational institution; or an identifier of a company name of a company with which the member is, or was, employed, and an identifier of a title of the member while employed with the company.

15. The system as recited in claim 11 wherein, processing the plurality of career transition vectors with the neural network to generate for each identifier an embedding in a common embedding space comprises:

processing the career transition vectors to generate, for each identifier, a vector representation of the identifier, with identifiers frequently occurring together as part of a career transition having vector representations that are close in distance to one another.

16. A non-transitory machine-readable storage medium including instructions that, when executed by a machine, cause the machine to perform operations comprising:

generating, by one or more processors, a plurality of career transition vectors, each career transition vector of the plurality of career transition vectors generated by concatenating identifiers associated with career transitions of a member as indicated in a member profile of the member;

with a neural network, processing the plurality of career transition vectors to generate for each identifier an embedding in a common embedding space;

detecting, by the one or more processors, access of a first member to a job search user interface;

selecting, by the one or more processors, one or more identifiers having an associated embedding that is close in distance to an embedding associated with a profile attribute in a member profile of the first member;

generating, by the one or more processors, one or more search starters associated with the one or more selected identifiers; and causing, by the one or more processors, presentation of the one or more search starters on the job search user interface.

17. The non-transitory machine-readable storage medium as recited in claim 16, wherein the identifiers are selected from a group consisting of:

an identifier of a company name of a company at which the member is, or was, employed;

an identifier of a title of the member;

an identifier of an educational institution and an identifier of a degree.

18. The non-transitory machine-readable storage medium as recited in claim 16, wherein generating the plurality of career transition vectors further comprises:

forming a career transition vector in the plurality of career transition vectors by concatenating pairs of an identifier of a company name of a company with which the member is, or was, employed, and an identifier of a title of the member while employed by the company.

19. The non-transitory machine-readable storage medium as recited in claim 16, wherein generating the career transition vectors further comprises:

forming a career transition vector in the plurality of career transition vectors by concatenating pairs of identifiers, each pair comprising one of:

an identifier of an educational institution attended by the member and an identifier of a degree obtained at the educational institution; or an identifier of a company name of a company with which the member is, or was, employed, and an identifier of a title of the member while employed with the company.

20. The non-transitory machine-readable storage medium as recited in claim 16, wherein selecting one or more identifiers having an associated embedding that is close in distance to an embedding associated with a profile attribute of the first member further comprises:

selecting a predetermined number of identifiers having associated embeddings that are close in distance to an embedding of a title of the first member.

* * * * *

UNITED STATES PATENT AND TRADEMARK OFFICE
CERTIFICATE OF CORRECTION

PATENT NO. : 11,205,155 B2  
APPLICATION NO. : 16/429365  
DATED : December 21, 2021  
INVENTOR(S) : Wakankar et al.

Page 1 of 1

It is certified that error appears in the above-identified patent and that said Letters Patent is hereby corrected as shown below:

In the Claims

In Column 20, Line 6, in Claim 2, after "institution", insert --;--

In Column 20, Line 6, in Claim 2, after "and", insert a linebreak

In Column 21, Line 40, in Claim 12, after "institution", insert --;--

In Column 22, Line 35, in Claim 17, after "institution", insert --;--

Signed and Sealed this  
First Day of March, 2022

Drew Hirshfeld  
*Performing the Functions and Duties of the  
Under Secretary of Commerce for Intellectual Property and  
Director of the United States Patent and Trademark Office*